United States Patent [19]

Vallon

[11] 4,403,153
[45] Sep. 6, 1983

[54] FREE-PISTON ELECTRIC CURRENT GENERATOR

[76] Inventor: Roger Vallon, 3, rue des Pleins Champs, 76000 Rouen, France

[21] Appl. No.: 364,265

[22] Filed: Apr. 1, 1982

[30] Foreign Application Priority Data

Apr. 3, 1981 [FR] France .............................. 81 06759

[51] Int. Cl.³ ...................... F02B 71/00; F02D 39/10
[52] U.S. Cl. ................................... 290/1 R; 123/46 E
[58] Field of Search .................. 290/1 R; 60/DIG. 1; 123/46 R, 46 E; 310/15, 23

[56] References Cited

U.S. PATENT DOCUMENTS 2,740,385  4/1956  Haage .................................. 123/46
4,342,920  8/1982  Bucknam ........................... 290/1 R

FOREIGN PATENT DOCUMENTS 237253  7/1925  United Kingdom .............. 290/1 R

Primary Examiner—J. V. Truhe
Assistant Examiner—Shelley Wade

[57] ABSTRACT

A medium-power, free-piston electric current generator is disclosed in which the piston is slidable in a vertical cylinder open at its top end, with a combustion chamber at its lower end. Induction coils are provided along the length of the cylinder. The piston is formed at least in part of magnetic material and the piston return is effected by the force of gravity. Valves for exhausting combustion gases are provided in the lower part of the cylinder and the opening and closing of the valves is synchronized with the movement of the piston. The cylinder and piston are cooled appropriately. The generator may employ gasoline, heating oil, a gas fuel or explosive substance.

12 Claims, 2 Drawing Figures

FREE-PISTON ELECTRIC CURRENT GENERATOR

FIELD OF THE INVENTION

The present invention relates to free-piston electric generators.

BACKGROUND OF THE INVENTION

Free-piston electric generators are already known which, according to the Diesel principle, supply medium-power turbo-alternators with hot gases at about 450° C. and an average pressure of about $3 \times 10^5$ pascals. Such generators have an overall efficiency of 35–36%, which is comparable to a conventional Diesel alternator system.

More recently there have been disclosed horizontal free-piston engines having one or two pistons in opposed movement, carrying annular magnetic members which reciprocate between induction coils provided in the cylinder associated therewith, thereby generating electric current in the coils. In such engines the compression of the Diesel fuel mixture at a suitable pressure is ensured by the return of the piston or pistons which is produced by the energy stored in springs or hydraulic accumulators of appropriate design as to their function and to the maintenance of the energy storage capacity over a period of time.

U.S. Pat. No. 3,105,153 and French printed patent application No. 2,204,068 both relate to free-piston electric current generators. In the first the free piston is suspended by oscillating cross member and in the second the free piston may be horizontal. Such apparatus have closed cylinders. Moreover, they require either an explosion in a second combustion chamber (U.S. Pat. No. 3,105,153) or metal springs (French printed patent application No. 2,204,068) to ensure the return of the piston or pistons and the compression of the gaseous mixture necessary for the following explosion.

SUMMARY OF THE INVENTION

It has been found that a medium-power free-piston electric current generator may be constructed with a single vertical piston wherein the return stroke of the piston is ensured by the force of gravity and the resulting apparatus, while being of simple design, permits the production of electric current at an exceptionally high efficiency and in normal operation produces very little pollution as it contains little or no unburnt substances.

According to the invention there is provided a medium-power free-piston electric generator apparatus, in which the free piston is slidable in sealing contact with the internal wall of a cylinder. The generator apparatus comprises a vertically oriented cylinder open at its upper end and having a combustion chamber at its lower end, with induction coils provided along at least part of the length of the cylinder, means for feeding a fuel-and-combustion supporting gas mixture, and means for ensuring ignition and combustion thereof in the cylinder. The free piston is made at least in part of magnetic material, and the return stroke of the free piston is effected by the force of gravity. Valves exhausting combustion gases are provided in the lower part of the cylinder. Means synchronize the opening and closing of the valves with the movement of the piston. Ports are located in the upper part of the cylinder above the top dead center position of the piston in normal operation. Cooling means are disposed in the body of the cylinder and/or on the outer surface thereof, along at least part of the length of the cylinder and on the piston.

Such an apparatus comprises a thermal machine which uses the known principle of free-piston engines and more particularly that of free-piston electric current generators which produce direct current having variable sign, voltage and strength.

According to the invention the return stroke of the piston is not ensured as in present-day apparatuses by a complex assembly of connecting rods, shafting or hydraulic accumulators but merely by the force of gravity, which is made possible by the vertical orientation of the cylinder. In addition this arrangement reduces friction to the extent possible.

The kinetic energy which is produced by the explosion and converted into potential energy when the piston reaches its top dead center position ensures, at least in part, during the return stroke of the piston to its low position, the compression of the fluids in the combustion chamber for the following explosion. The compression and explosion of the air-gasoline, air-heating fuel or air-gas mixture is carried out as is known in Diesel engines or internal-combustion engines.

According to an embodiment of the present invention the explosion which constitutes the source of energy which is converted into electric current is produced by combustion or detonation of a suitable metered quantity of an explosive substance selected among those known in the art as suitable for the characteristics of the apparatus and introduced into the combustion chamber at the bottom of the cylinder during each return stroke of the piston to its low position.

According to a particularly preferred embodiment the apparatus comprises a two-stage piston having an upper stage provided with piston rings having a diameter substantially equal to that of the inner diameter of the cylinder and a lower stage having a smaller diameter which alone is engageable into the actual combustion chamber which is substantially at the same diameter. The lower stage of the two-stage piston may advantageously be equipped with piston rings though this is not absolutely necessary.

BRIEF DESCRIPTION OF THE DRAWING

The invention will now be described in greater detail with reference to the two Figures of drawing which illustrates a diagrammatic sectional view of the main components of a purely illustrative embodiment of the apparatus, which is in no way meant to limit the invention.

DESCRIPTION OF THE PREFERRED EMBODIMENT

Figure 1:
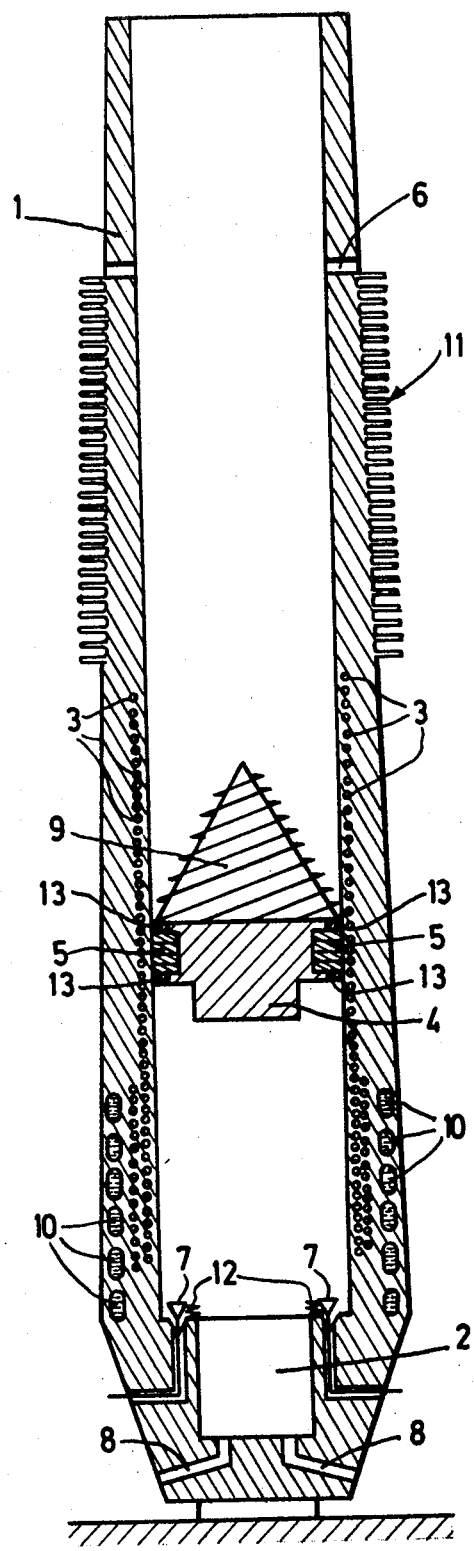
Figure 2:
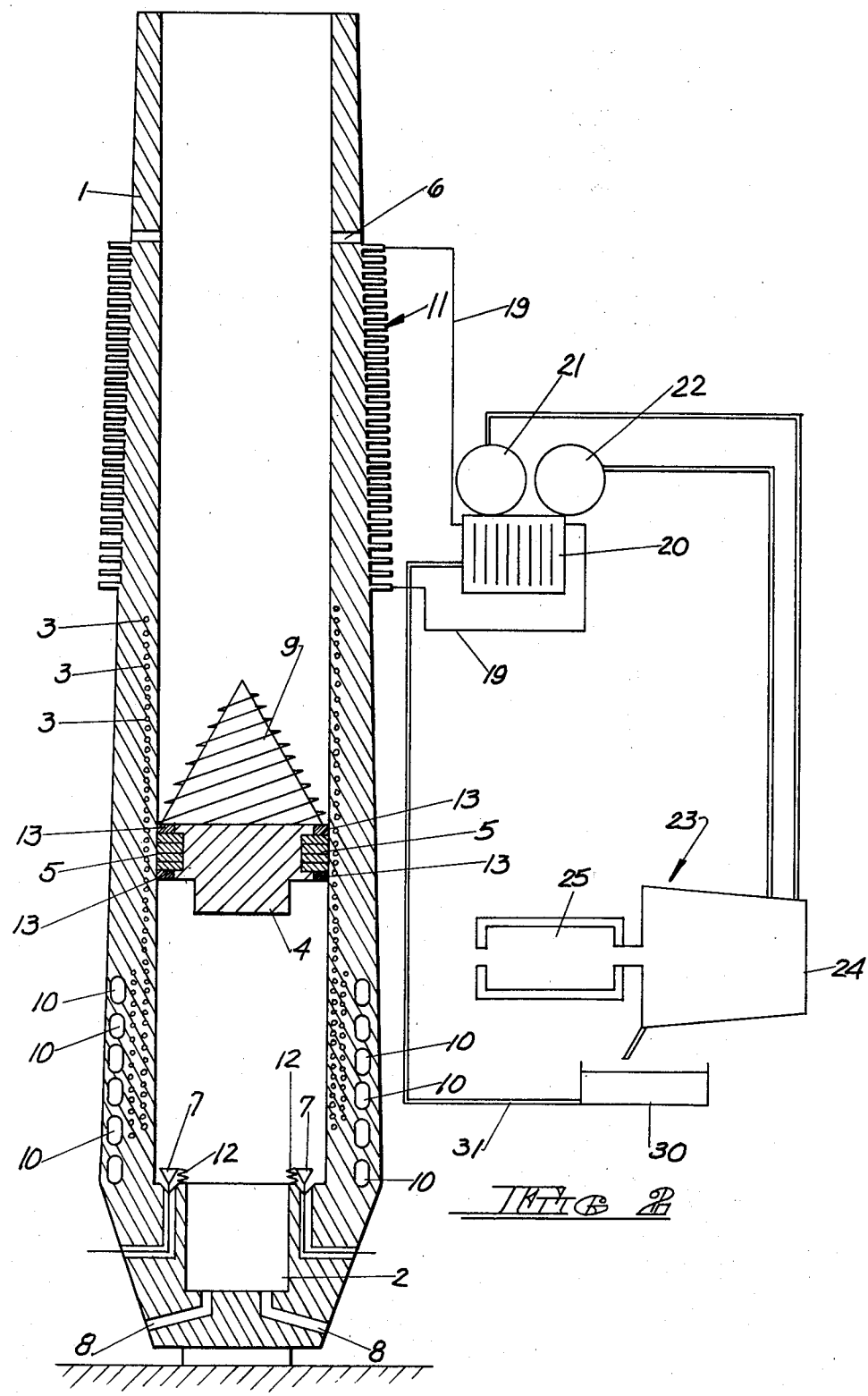

The free-piston electric generator illustrated in the drawing comprises a cylinder 1 positioned vertically with its upper end open to the surroundings. The combustion or explosion chamber 2 is located in the lower part and bottom of the cylinder which is closed. The combustion chamber 2 has a volume calculated as a function of the power to be produced for each explosion and as a function of the type and properties of the combustible mixture employed. Depending on availabilities of the types of fuels, the combustion chamber 2 is supplied with an air-gasoline mixture, an air-heating oil mixture or an air-gas mixture, under the best conditions known in the art, which have long been proven in internal-combustion and Diesel engines, namely: mechanical injection, feeding turbocharged with exhaust gases, etc.

Cylinder 1 is equipped, in the conditions which preliminary tests have shown to be the highest efficiency conditions, with a series of induction coils 3, the density of the turns of the coils being calculated as a function of the desired voltage at the output terminals of the circuit, and taking into account the fact that the speed of the piston 4 carrying the permanent magnetic material 5 diminishes when the piston rises in the cylinder to its top dead center position which corresponds to the equilibrium pressure between the inside of the expansion chamber for gases under the piston and the atmosphere.

For reasons of safety the cylinder 1, whose overall length may, for example, be about 490 cm for an internal diameter of about 60 cm must be provided with one or more ports 6 in its upper part at a level slightly above that the piston reaches at the end of its stroke if the operation is normal. The ports 6 ensure that the piston does not rise substantially higher than normal in case of accidental overpressure. It must be emphasized that these ports 6 are not used for exhausting combustion products in normal operation. The exhausting of combustion products is, as indicated above, effected through valves 7 disposed in the lower part of the cylinder. The opening of the valves is controlled by synchronizing means which is designed to take as its starting point for the opening substantially the moment the piston is going to descend from the top dead center position. The closing of the valves 7 is controlled by the same synchronizing means and tripped by the passage of the piston at a point in the cylinder previously calculated to be where the volume contained in the piston has been suitably scavenged, the compression of residual gases, ensured by the kinetic energy of the piston adding to the pressure of the combustion-supporting gas and fuel introduced, provides in the actual combustion chamber 2 ignition or self-ignition conditions.

The combustion-supporting gases, the fuel or the explosive material are introduced by conventional means in metered amounts at 8 into the lower part of the combustion chamber.

The apparatus is cooled by any suitable conventional means. The cylinder 1 may, for example, be cooled by a flow of water in the lower part thereof which is at the highest temperature and in the upper part thereof only by external fins 11 which increases the heat transfer surface with the surroundings. As for the cooling of the piston it may be improved, if desired, by a fin member on the upper surface of the piston for taking advantage of the vertical reciprocation to give off as much heat as possible from the body of the piston 4. The fin member 9 is preferably conical or helical in shape, is made of good heat transfer material, and causes slight rotation of the piston which contributes to uniform wear of the cylinder wall.

Nevertheless it must be noted that the expansion of the combustion gases produced by the explosion in the combustion chamber may continue to completion in the system, contrary to what occurs in conventional systems, and cools the resulting combustion gases naturally so that the temperature thereof does not exceed 250° C.

The piston 4 is equipped with permanent magnets 5 of annular configuration embedded in the nonmagnetic body which defines the piston 4. The strength of the permanent magnets 5 is calculated so as to ensure with the induction coils 3 in the cylinder the fastest braking or deceleration of the piston and the generation of direct current having the desired strength and voltage. With Diesel type engine operation the mass of the piston must be such that the kinetic energy at the end of its return stroke ensures in the actual combustion chamber a pressure of $1.2-2\times 10^6$ pascals necessary for self-ignition of the Diesel fuel mixture. Such a piston advantageously has two stages as indicated above, as is known at the present time for certain types of engines. This two-stage configuration ensures good scavenging conditions during the descent of the piston. The lower part of the piston of smaller diameter penetrates into the actual combustion chamber. After the explosion in the combustion (i.e. explosion) chamber the piston moves upwardly, permitting the expansion of gases in the larger diameter space which enables use of high power permanent magnets and coils. Thus, the height of the cylinder is limited to the optimum length from the standpoint of expansion and the quality of combustion. The combustion is substantially complete since there is nothing to interfere with it in practice, the pollution due to any possible unburnt substances is reduced to a minimum.

The permanent magnets and the nonmagnetic material of the body of the piston must be able to resist repeated shocks and impacts and the elevated temperature at the beginning of the combustion. The piston may advantageously be provided with a high temperature resistant insulating lining on its lower end surface in contact with the hot combustion chamber.

When operating with an explosive charge the piston must be lighter, but must have very good shock resistance. It may then have a single diameter, the explosion or combustion chamber being very small. In such an arrangement there is no compression of the gas during the return stroke of the piston, but simply the confining of the gas at the time of explosion (combustion or detonation). In this modified embodiment using an explosive charge, it is important, however, to keep the electric circuit closed so that the operation of the coils due to the circuit being closed during the downstroke of the piston slows the movement of the piston and generates direct current with a sign opposite to that produced during the upstroke of the piston.

Conversely, when the mixture is fuel and a combustion-supporting gas, it is advantageous to open the electric circuit as soon as the piston is in its top dead center position and close it only at the instant the next explosion is produced.

The apparatus is supported on a suitable base designed to absorb a large part of the shocks or impacts produced by the repeated explosions. The damping of shocks may advantageously be provided by means of a hydraulic shock absorber.

The coils are connected in accordance with the intended use of the apparatus and the desired conversion of the resulting current.

In operation a suitable air-gasoline, air-heating oil or air-gas mixture is ignited by a spark or pressure, or a suitable explosive charge is detonated. The piston is driven upwards at a rather high speed, thereafter slowed by the generation of direct current. The expanded gases are cooled and the piston is at zero velocity at the top of its upstroke. The piston then falls, scavenging the resulting combustion gases, and compressing the remaining combustion at the end of the downstroke, and gases are injected at elevated pressure into the combustion chamber. The injection of the fuel at high pressure or the ignition of the explosive charge produced rapid combustion and expansion of the gas combustion products. The piston then starts its upstroke for another cycle.

The current generated in the coils 19 may be used to supply a bank of conventional accumulators or directly by a dynamo, or, preferably, for electrolysis in one of its many forms.

The current may thus serve in an electrolyzer 20 operating under pressure ($2-3 \times 10^6$ pascals) and elevated temperature. The hydrogen 21 and oxygen 22 produced are introduced into a turboalternator 23 having a turbine 24 and an alternator 25. The detonation of the mixture is avoided and at least part of the exhaust gases are fed back into the apparatus. The turbo-alternator 23 thus supplied produces a.c. at the desired voltage. A small volume storage is sufficient to ensure the smooth operation of the turbine 24 and compensate for the fact that the generation of d.c. is cyclical.

The oxygen produced in the electrolyzer 20 under pressure may be used directly in the combustion chamber of the generator. This amount of oxygen must be supplemented by a substantially greater amount of air at lower pressure (about $6 \times 10^5$ pascals) in the combustion chamber slightly before the pure oxygen and the fuel. The process permits the volume of the combustion chamber to be reduced and substantially improves the overall efficiency even further, by avoiding heating to an elevated temperature a quantity of nitrogen which interfers with conventional combustion processes. In this arrangement the hydrogen exiting 21 the electrolyzer 20 under pressure may be consumed with air in a turbine. At the exit of the turbine after expansion and cooling, an amount of water 30 is recovered necessary for the supply 31 of the electrolyzer. The hydrogen thus produced in particularly advantageous conditions may be used in hydrogeno chemistry or hydrogeno metallurgy.

The apparatus of the invention may be used at a stationary location or transported (for example on aboard a ship).

As brought out above, the improved efficiency of this type of generator apparatus as compared to efficiencies of about 1000–6000 KWh Diesel engines comes from, on the one hand, the near total elimination of friction which conventionally uses about 5% of the energy produced by engines and on the other hand, the complete use of the expansion of the gases which are exhausted at about 240° C., directly improving the energy yield. Thus, nearly half of the losses due to cooling the cylinder are eliminated. As the customary losses found in engines of this power range are about 28%, the improved efficiency in this respect may be an increase of about 14 percentage points.

All told, the efficiency of the actual generator may reach 57%, from which the losses inherent in the conversion of the electric current produced must be deducted. But such losses are low if the current produced is used directly in electrolysis apparatus. They may be only about 3% if an electronic synthesizer is used. In a current conversion assembly comprising a bank of accumulators and a generator-alternator system, the overall efficiency is still about 43%.

Without these values being a limitation of the present invention, the length of the cylinder may be about 5–6 meters and the internal diameter 500 mm, whereas the lower part of the two-stage piston has a diameter of 300–400 mm. With a piston having an appropriate mass, the frequency for a Diesel generator is 30–40 strokes/minute. The power output is about 200–1800 KWh. The consumption is about 150 g of heating oil or the equivalent thereof for about 1 KWh produced.

The temperature of the gases at the exist is about 200°–240° C. and at least part of these gases may be recovered and conveyed to turbo-charger for supercharging in case of a Diesel engine.

To overcome any defect in feeding fuel and for stopping the operation a damping system 12 is provided at the lower part of the cylinder outside the combustion chamber.

The piston is lubricated at the top dead center position by injecting a suitable quantity of oil between the piston rings 13.

What is claimed is:

1. A medium-power, free-piston electric current generator apparatus, in which said free-piston is slidable in and in sealing contact with the internal wall of a cylinder, said generator apparatus comprising:
   said cylinder being vertically oriented and open at its upper end and having a combustion chamber at its lower end, induction coils being provided along at least part of the length of said cylinder, means for feeding a fuel-and-combustion supporting gas mixture into said cylinder;
   said free piston being made at least in part of magnetic material, and being movable within the cylinder from a lowermost rest position to an uppermost top dead center position in normal operation, the return stroke of said free piston being effected by the force of gravity;
   valves for exhausting combustion gases being provided in the lower part of said cylinder, and means for synchronizing the opening and closing of said valves with movement of said piston;
   ports located in the upper part of said cylinder above said top dead center position of said piston in normal operation, and means for cooling said cylinder and said piston.

2. Apparatus according to claim 1, wherein said means for feeding fuel-and-combustion supporting gas mixture into said cylinder is adapted to carry an air-and-gasoline mixture under pressure.

3. Apparatus according to claim 1, wherein said means for feeding fuel-and-combustion supporting gas mixture into said cylinder is adapted to carry an air-and-heating oil mixture under pressure.

4. Apparatus according to claim 1, wherein said means for feeding fuel-and-combustion supporting gas is adapted to carry an air-and-gas mixture under pressure.

5. Apparatus according to claim 1, wherein said means for feeding fuel-and-combustion supporting gas is adapted to carry an explosive charge.

6. Apparatus according to claim 1, wherein said piston comprises a two-stage piston, the upper stage of said piston having a diameter substantially equal to that of the internal wall of said cylinder, and the lower stage of said piston having a smaller diameter, said combustion chamber also having a smaller diameter, only said lower stage being adapted to penetrate into said combustion chamber which is of substantially the same diameter as said lower stage of said piston.

7. Apparatus according to claim 1, wherein said valves are arranged in the lower part of said cylinder, said synchronizing means being responsive to said piston reaching the top dead center position to open said valves, said synchronizing means being responsive to the passage of said piston through a point along the length of said cylinder at which the combustion gases contained in the cylinder below said piston have been suitably scavenged, the pressure exerted by the downstroke of said piston to its bottom dead center position producing a pressure substantially equal to that in the combustion chamber of said cylinder upon ignition.

8. Apparatus according to claim 7, which comprises means for introducing into said combustion chamber gases under high pressure during the downstroke of said piston.

9. Apparatus according to claim 1, wherein the mass of said piston is such as to produce at the end of its return or downstroke a pressure in said combustion chamber of 1.2 to $2 \times 10^6$ pascals.

10. Apparatus according to claim 1, wherein said coils have taps connected to electrolysis means for supplying current thereto.

11. Apparatus according to claim 1, wherein said apparatus is connected to an electrolyzer operating under pressure and at elevated temperature, and to a turbo-alternator, wherein are introduced hydrogen and oxygen produced in said electrolyzer and at least part of the exhaust gases from the apparatus.

12. Apparatus according to claim 11, wherein said means for feeding fuel-and-combustion supporting gas carries oxygen produced under pressure in said electrolyzer together with air under pressure at the combustion-supporting gas.

* * * * *